United States Patent
Yang et al.

(10) Patent No.: US 9,125,114 B2
(45) Date of Patent: Sep. 1, 2015

(54) INTER RADIO ACCESS TECHNOLOGY (IRAT) MEASUREMENT

(71) Applicant: QUALCOMM Incorporated, San Diego, CA (US)

(72) Inventors: Ming Yang, San Diego, CA (US); Tom Chin, San Diego, CA (US); Qingxin Chen, Del Mar, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 13/679,418

(22) Filed: Nov. 16, 2012

(65) Prior Publication Data

US 2014/0140223 A1    May 22, 2014

(51) Int. Cl.
H04W 24/00    (2009.01)
H04W 36/00    (2009.01)
H04W 36/14    (2009.01)

(52) U.S. Cl.
CPC .......... *H04W 36/0088* (2013.01); *H04W 36/14* (2013.01)

(58) Field of Classification Search
CPC .................................................... H04W 28/00
See application file for complete search history.

(56) References Cited

U.S. PATENT DOCUMENTS

| | | | |
|---|---|---|---|
| 7,200,124 B2 | 4/2007 | Kim et al. | |
| 2001/0033579 A1* | 10/2001 | Nelson et al. | 370/447 |
| 2009/0270103 A1 | 10/2009 | Pani et al. | |
| 2010/0222064 A1 | 9/2010 | Gao et al. | |
| 2011/0122823 A1* | 5/2011 | Chen | 370/328 |
| 2012/0020331 A1 | 1/2012 | Chin et al. | |
| 2012/0069758 A1* | 3/2012 | Kim et al. | 370/252 |
| 2012/0113826 A1 | 5/2012 | Zhou et al. | |
| 2013/0250916 A1* | 9/2013 | Aoyagi et al. | 370/331 |
| 2014/0056243 A1* | 2/2014 | Pelletier et al. | 370/329 |

FOREIGN PATENT DOCUMENTS

| | | |
|---|---|---|
| CN | 101547459 B | 2/2011 |
| EP | 2242300 A1 | 10/2010 |
| WO | 2011041662 A1 | 4/2011 |
| WO | 2011079210 A1 | 6/2011 |

OTHER PUBLICATIONS

International Search Report and Written Opinion—PCT/US2013/070304—ISA/EPO—Aug. 13, 2014.

* cited by examiner

*Primary Examiner* — Huy D Vu
*Assistant Examiner* — Teisha D Hall
(74) *Attorney, Agent, or Firm* — Kristine U. Ekwueme

(57) ABSTRACT

A user equipment (UE) may perform an inter radio access technology (IRAT) measurement in time slots not deemed to be carrying critical data. In such instances, the UE only transmits and decodes critical data in the critical time slots when a serving cell signal is low for a determined period of time. Otherwise, when the time slots do not carry critical data, i.e., non-critical time slots, the UE stops transmitting and decoding and uses the non-critical time slots for IRAT measurement.

20 Claims, 6 Drawing Sheets

INTER RADIO ACCESS TECHNOLOGY (IRAT) MEASUREMENT

BACKGROUND

1. Field

Aspects of the present disclosure relate generally to wireless communication systems, and more particularly, to improving inter radio access technology (IRAT) measurement in TD-SCDMA when a UE is in a connected mode.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), which extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes determining whether a serving cell signal strength is below a threshold level for a predetermined period of time, when a measurement gap is not long enough for an inter-radio access technology (IRAT) measurement or no measurement gap exists. The method may include decoding and transmitting downlink and uplink timeslots containing critical data when the signal strength is below the threshold level for the predetermined period of time. The method may also include stopping decoding and transmitting downlink and uplink timeslots not containing critical data when the signal strength is below the threshold level for the predetermined period of time. The method may further include performing IRAT measurement during the time slots not containing critical data.

According to another aspect of the present disclosure, an apparatus for wireless communication includes means for determining whether a serving cell signal strength is below a threshold level for a predetermined period of time, when a measurement gap is not long enough for an IRAT measurement or no measurement gap exists. The apparatus may include means for decoding and transmitting downlink and uplink timeslots containing critical data when the signal strength is below the threshold level for the predetermined period of time. The apparatus may also include means for stopping decoding and transmitting downlink and uplink timeslots not containing critical data when the signal strength is below the threshold level for the predetermined period of time. The apparatus may further include means for performing IRAT measurement during the time slots not containing critical data.

According to one aspect of the present disclosure, a computer program product for wireless communication in a wireless network includes a computer readable medium having non-transitory program code recorded thereon. The program code includes program code to determine whether a serving cell signal strength is below a threshold level for a predetermined period of time, when a measurement gap is not long enough for an IRAT measurement or no measurement gap exists. The program code includes program code to decode and transmit downlink and uplink timeslots containing critical data when the signal strength is below the threshold level for the predetermined period of time. The program code includes program code to stop decoding and transmitting downlink and uplink timeslots not containing critical data when the signal strength is below the threshold level for the predetermined period of time. The program code further includes program code to perform IRAT measurement during the time slots not containing critical data.

According to one aspect of the present disclosure, an apparatus for wireless communication includes a memory and a processor(s) coupled to the memory. The processor(s) is configured to determine whether a serving cell signal strength is below a threshold level for a predetermined period of time, when a measurement gap is not long enough for an IRAT measurement or no measurement gap exists. The processor(s) is further configured to decode and transmit downlink and uplink timeslots containing critical data when the signal strength is below the threshold level for the predetermined period of time. The processor(s) is further configured to stop decoding and transmitting downlink and uplink timeslots not containing critical data when the signal strength is below the threshold level for the predetermined period of time. The processor(s) is further configured to perform IRAT measurement during the time slots not containing critical data.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
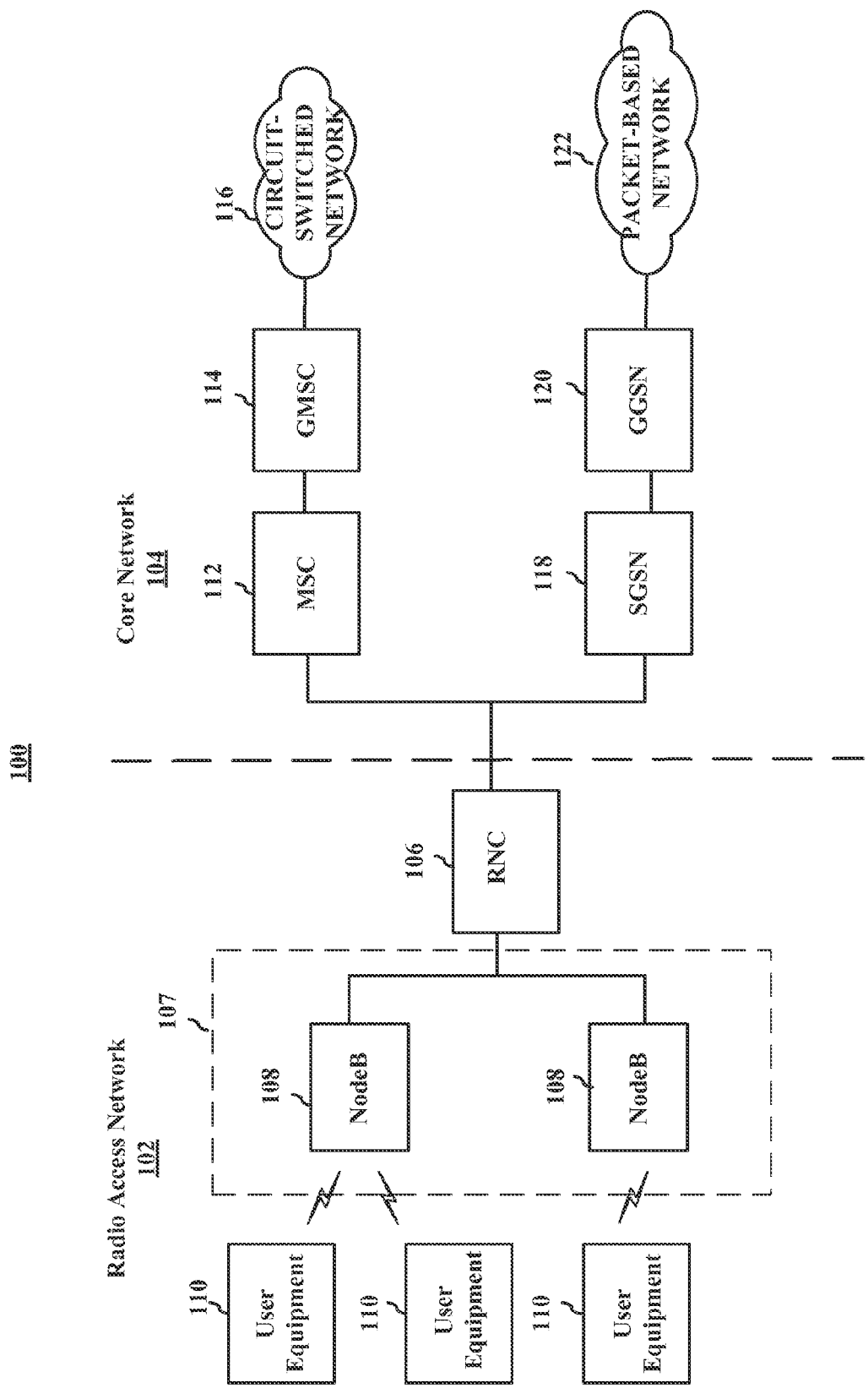
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
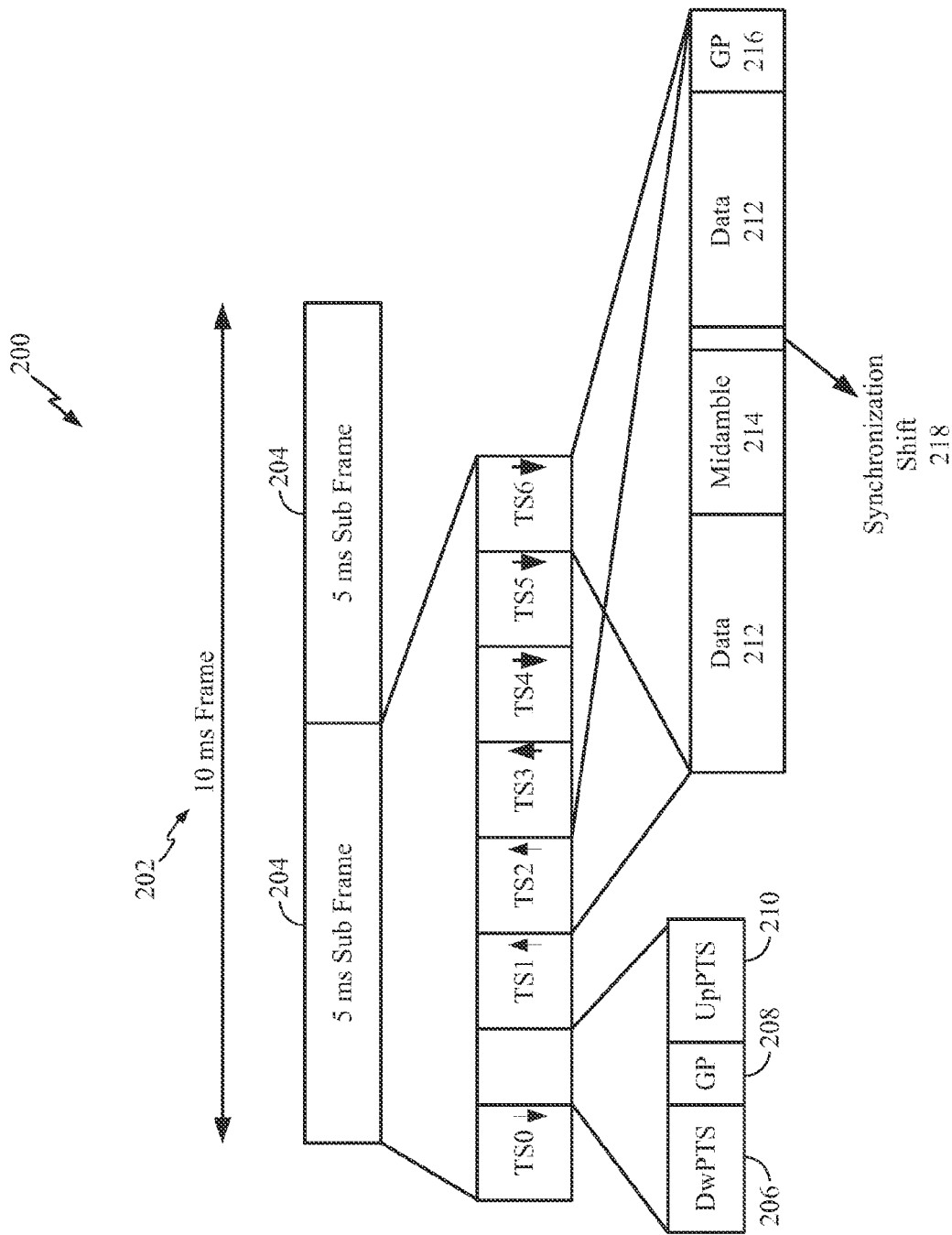
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
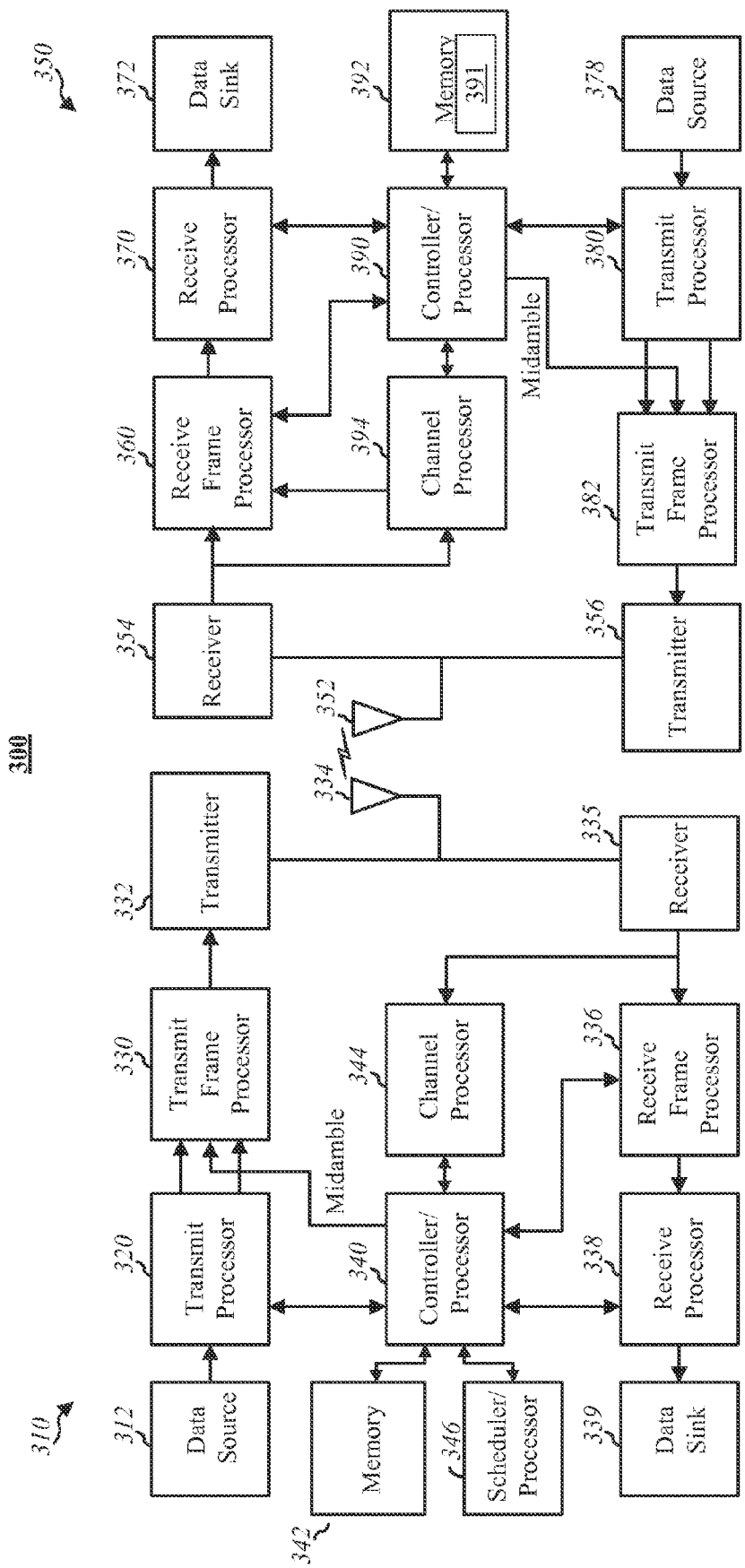
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a IRAT measurement module 391 which, when executed by the controller/processor 390, configures the UE 350 for inter-RAT/inter-frequency measurements. A scheduler/processor 346 at the node B 310 may be used to allocate resources to the UEs and schedule downlink and/or uplink transmissions for the UEs.

Certain UEs may be capable of communicating on multiple radio access technologies (RATs). Such UEs may be referred to as multimode UEs. For example, a multimode UE may be capable of communications on a Universal Terrestrial Radio Access (UTRA) frequency division duplexed (FDD) network such as a Wideband-Code Division Multiple Access (W-CDMA) network, a UTRA time division duplexed (TDD) network such as a Time Division-Synchronous Code Division Multiple Access (TD-SCDMA) network, Global System for Mobile Communications (GSM) and/or a Long Term Evolution (LTE) network.

Inter Radio Access Technology (IRAT) Measurement in TD-SCDMA Connected Mode

Figure 4:
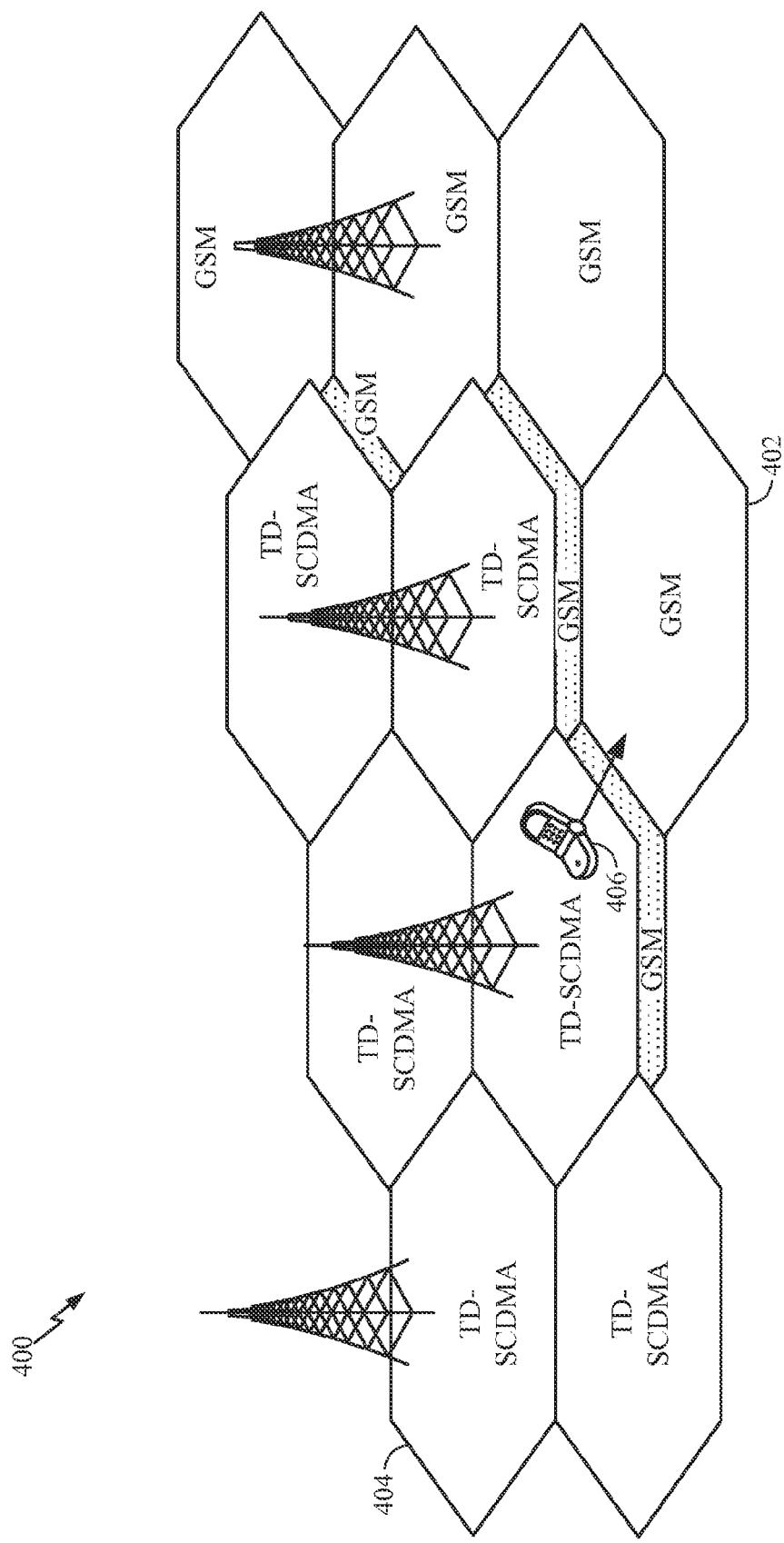
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

A radio bearer can use one or more code channels for each time slot (TS) to send data. For example, a circuit-switched (CS) 12.2 kbps radio bearer can use two (2) code channels in one uplink time slot (TS) and two (2) code channels in one downlink time slot to transmit data. For high date rate communications, multiple time slots are allocated. The other time slots are called idle time slots. The UE can use the idle time slots to tune to another system/frequency to perform inter-radio access technology (IRAT) measurements, which may include, but are not limited to, received signal strength indicator (RSSI) measurements, frequency correction channel (FCCH) tone detection, base station identity code (BSIC) confirm and BSIC reconfirm.

TD-SCDMA does not have a compress mode and only the idle time slots are available to perform IRAT measurements, such as GSM IRAT measurements. Because of the unavailability of large transmission gaps or idle time slots in TD-SCDMA systems, performing IRAT measurements may be challenging, especially for multi-time slot packet switched calls. For example, during a transmission gap, a UE may tune to a new frequency of a neighbor RAT, perform the IRAT measurement and tune back to the frequency of the serving RAT. Because the gap is not long enough for an IRAT measurement or because of the non-existence of gaps in TD-SCDMA systems, no IRAT measurement or only a single IRAT measurement may be performed during a transmission. The unavailability or limited availability of idle time slots in TD-SCDMA systems may cause a delay in IRAT measurements such as IRAT RSSI measurements, and also delay BSIC confirm and reconfirm. This delay in IRAT measurement may result in dropped calls and/or degraded IRAT handover performance.

One aspect of the present disclosure allows IRAT measurements to be performed in time slots not deemed to be critical time slots. In particular, when the serving cell signal is low for a determined period of time, the UE only transmits and decodes critical time slots. Additionally, the UE stops receiving and transmitting in non-critical time slots. During the call set up, the UE receives an indication of the critical and non-critical time slots.

When performing cell measurements, the UE may measure, among other things, a signal strength such as a received signal code power (RSCP) of a primary common control physical channel (PCCPCH), which is transmitted in a first time slot (TS0) of each subframe. The signal strength (e.g., RSCP of the PCCPCH) of a serving cell may be evaluated against a threshold to facilitate handover. The first time slot TS0 of each subframe may be configured to transmit the RSCP of the PCCPCH, a secondary common control physical channel, a paging channel (e.g., reference signal) and the like. The time slot TS0 may be allocated for inter/intra frequency measurements rather than for GSM measurement. The other time slots TS1-TS6 may be allocated for carrying traffic such as critical data. During uplink or downlink communications, however, only one time slot may be allocated for carrying the critical data.

In one aspect, under some network conditions, the time slots not allocated for critical data may be used for IRAT measurement, such as GSM measurement, while the UE decodes/transmits time slots having critical data. For example, when the gap is too small to perform IRAT measurement, and when the serving cell quality is below a particular threshold for a predefined amount of time, the UE can be configured to only transmit/decode downlink and uplink time slots containing the critical data.

The time slots carry various types of data, some of which may be categorized as critical data. Additionally, the various types of critical data may be prioritized. The network may indicate to the UE during a call set-up, the time slots carrying critical data. Examples of critical data are described.

Critical data may include loop power control information, such as a transmit power control (TPC) command, to support the closed loop power control and may also include a synchronization shift (SS) command to support the closed loop timing adjustment.

Other critical data may include a dedicated physical channel (DPCH) carrying radio resource control (RRC)/non-access stratum (NAS) messages (e.g., call set-up and handover information), and TD-HSDPA and TD-HSUPA related control or data channels. Under poor network conditions, the UE may transmit/decode the critical data while stopping the transmission/decoding of time slots for other channels such as DPCH not carrying RRC/NAS messages, and/or TD-HSDPA and TD-HSUPA related control or data channels.

Further, critical data may include signaling messages such as scheduling information, status report information and channel reconfiguration information (e.g., from low data rate to high data rate). In one aspect of the disclosure the transmission/decoding of time slots carrying critical data may be prioritized. The critical data with the highest priority may be the transmit power control and synchronization shift commands followed by the DPCH carrying RRC/NAS messages and then the signaling messages. All other time slots may be allocated for IRAT measurements for a pre-defined period of time.

In one aspect, the time slots are prioritized according to the type of critical data they carry. For example, a time slot having power control information (e.g., TPC), and/or timing adjustment information (e.g., SS) is assigned the highest priority. In particular, time slots having TPC and/or SS are decoded first.

Time slots having call setup, channel reconfiguration and/or handover information are assigned the second highest priority. In particular, time slots with RRC and/or NAS messages have the second highest priority and will be decoded accordingly.

The time slots having signaling messages, such as scheduling and/or status report information, are assigned the third highest priority and are decoded after the time slots assigned first and second priorities. The time slots not having critical data assigned a first, second or third priority are dropped and measurement reports may instead be performed during those time slots.

Furthermore, the critical data may be based on the services provided by the critical data. For example, the critical data may be defined as a circuit switched voice call data, a packet switched voice call data or any other data defined by the services provided. In one aspect, the circuit switched voice call data may have a higher priority than the packet switched voice call data.

Limiting transmission/decoding to downlink and uplink time slots containing critical data when certain network conditions are met, provides opportunities to perform IRAT measurements during non-critical time slots, which reduces IRAT measurement delay and reduces the occurrence of dropped calls and/or degraded IRAT handover performance when the UE is out of the TD-SCDMA coverage area.

Figure 5:
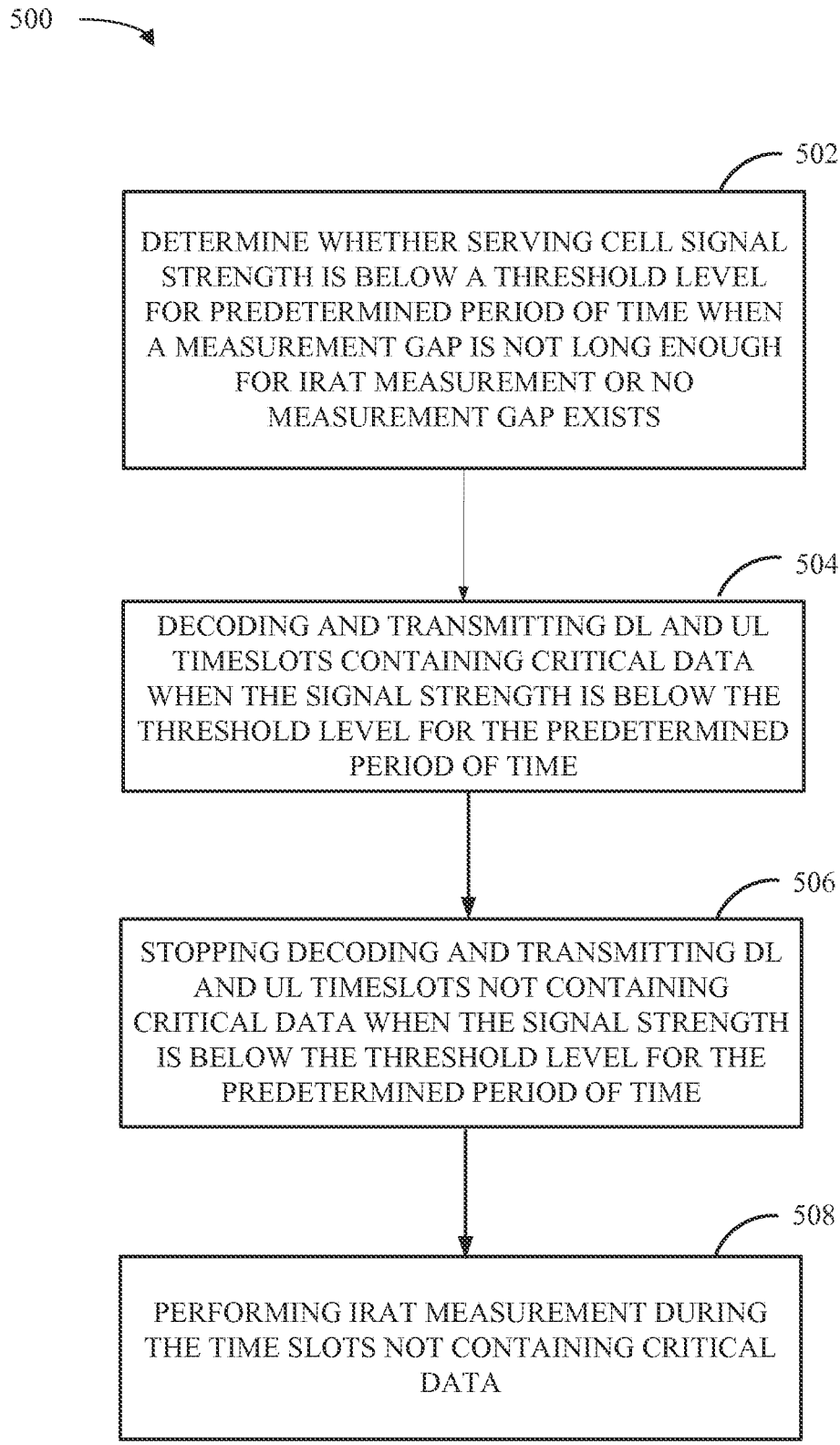
FIG. 5 is a block diagram illustrating an inter radio access technology measurement method when a UE is in a connected mode.

FIG. 5 shows a wireless communication method 500 according to one aspect of the disclosure. In block 502, when a measurement gap is not long enough for an IRAT measurement or no measurement gap exists, a UE determines whether a serving cell signal strength is below a threshold level for a predetermined period of time. When the signal strength is below the threshold level for the predetermined period of time, the UE decodes and transmits downlink and uplink timeslots containing critical data, as shown in block 504. In block 506, the UE stops decoding and transmitting downlink and uplink timeslots not containing critical data when the signal strength is below the threshold level for the predetermined period of time. The UE performs IRAT measurement during the time slots not containing critical data, as shown in block 508.

Figure 6:
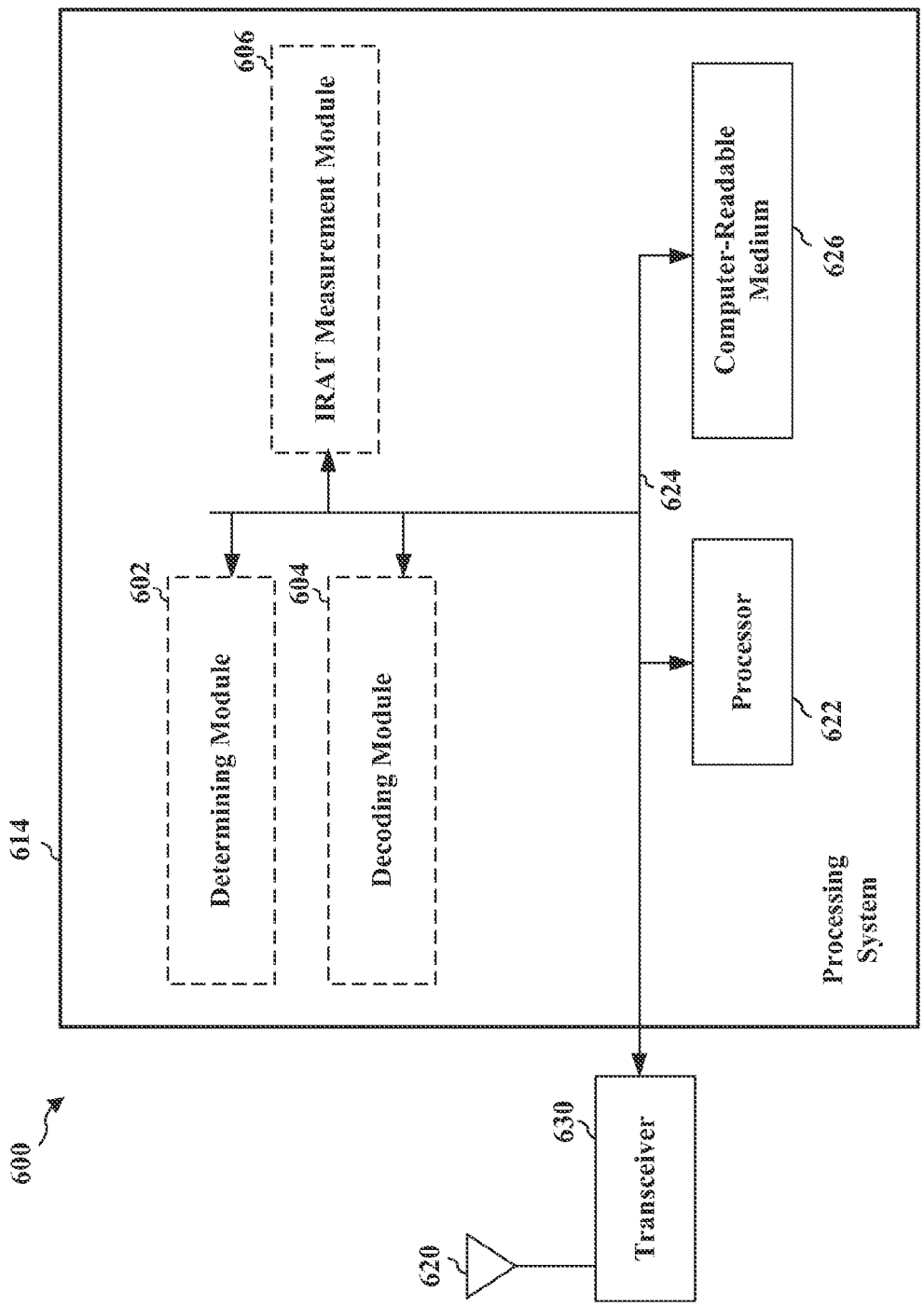
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing an IRAT measurement system 614. The measurement system 614 may be implemented with a bus architecture, represented generally by the bus 624. The bus 624 may include any number of interconnecting buses and bridges depending on the specific application of the measurement system 614 and the overall design constraints. The bus 624 links together various circuits including one or more processors and/or hardware modules, represented by the processor 622 the modules 602, 604, 606 and the computer-readable medium 626. The bus 624 may also link various other circuits such as timing sources, peripherals, voltage regulators, and power management circuits, which are well known in the art, and therefore, will not be described any further.

The apparatus includes an optimized measurement system 614 coupled to a transceiver 630. The transceiver 630 is coupled to one or more antennas 620. The transceiver 630 enables communicating with various other apparatus over a transmission medium. The measurement system 614 includes a processor 622 coupled to a computer-readable medium 626. The processor 622 is responsible for general processing, including the execution of software stored on the computer-readable medium 626. The software, when executed by the processor 622, causes the measurement system 614 to perform the various functions described for any particular apparatus. The computer-readable medium 626 may also be used for storing data that is manipulated by the processor 622 when executing software.

The measurement system 614 includes a determining module 602 for determining whether a serving cell signal strength is below a threshold level for a predetermined period of time. The measurement system 614 includes a decoding module 604 for decoding and transmitting downlink and uplink timeslots containing critical data when the signal strength is below the threshold level for the predetermined period of time. The decoding module 604 may also stop decoding and transmitting downlink and uplink timeslots not containing critical data when the signal strength is below the threshold level for the predetermined period of time. The measurement system 614 includes a measurement module 606 for performing IRAT measurement during the time slots not containing critical data. The modules may be software modules running in the processor 622, resident/stored in the computer-readable medium 626, one or more hardware modules coupled to the processor 622, or some combination thereof. The measurement system 614 may be a component of the UE 350 and may include the memory 392, and/or the controller/processor 390.

In one configuration, an apparatus, such as a UE 350, is configured for wireless communication including means for determining. In one aspect, the determining means may be the antennas 352, the receiver 354, receive processor 370, receive frame processor 360, the controller/processor 390, the memory 392, the measurement module 391, determining module 602, decoding module 604 and/or the measurement system 614 configured to perform the function recited by the aforementioned means. The UE 350 is also configured to include a means for decoding. In one aspect, the decoding means may be the controller/processor 390 and/or the memory 392 configured to perform the function recited by the aforementioned means. The UE 350 is also configured to include a means for measuring. In one aspect, the measuring means may be the controller/processor 390, the memory 392, antennas 352, the receiver 354, receive processor 370, receive frame processor 360, the measurement module 391, measurement module 606 and/or the measurement system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining whether a serving cell signal strength is below a threshold level for a predetermined period of time, when a measurement gap corresponding to an idle time slot is not long enough for an inter-radio access technology (IRAT) measurement or no measurement gap exists;
   decoding and transmitting critical data during downlink and uplink time slots when the signal strength is below the threshold level for the predetermined period of time;
   stopping decoding and transmitting non-critical data during downlink and uplink timeslots when the signal strength is below the threshold level for the predetermined period of time; and
   performing IRAT measurement during non-critical time slots, in which the non-critical time slots comprise the time slots that do not carry the critical data.

2. The method of claim 1, in which the critical data comprises power control and timing adjustment information.

3. The method of claim 1, in which the critical data comprises call setup, channel reconfiguration and/or handover information.

4. The method of claim 1, in which the critical data comprises scheduling and status report information.

5. The method of claim 1, in which the critical data is defined based on a prioritization of information type, a highest priority information including power control and timing adjustment information, a next highest priority information including radio resource control (RRC) information.

6. The method of claim 1, in which the critical data is defined based on a service the critical data provides and in which a circuit switched voice call data has higher priority than a packet switched data.

7. An apparatus for wireless communication, comprising:
   means for determining whether a serving cell signal strength is below a threshold level for a predetermined period of time, when a measurement gap corresponding to an idle time slot is not long enough for an inter-radio access technology (IRAT) measurement or no measurement gap exists;
   means for decoding and transmitting critical data during downlink and uplink time slots when the signal strength is below the threshold level for the predetermined period of time;
   means for stopping decoding and transmitting non-critical data during downlink and uplink timeslots when the signal strength is below the threshold level for the predetermined period of time; and
   means for performing IRAT measurement during non-critical time slots, in which the non-critical time slots comprise the time slots that do not carry the critical data.

8. The apparatus of claim 7, in which the critical data comprises power control and timing adjustment information.

9. The apparatus of claim 7, in which the critical data comprises call setup, channel reconfiguration and/or handover information.

10. The apparatus of claim 7, in which the critical data comprises scheduling and status report information.

11. An apparatus for wireless communication, comprising:
    a memory; and
    at least one processor coupled to the memory and configured:
       to determine whether a serving cell signal strength is below a threshold level for a predetermined period of time, when a measurement gap corresponding to an idle time slot is not long enough for an inter-radio access technology (IRAT) measurement or no measurement gap exists;
       to decode and transmit critical data during downlink and uplink time slots when the signal strength is below the threshold level for the predetermined period of time;
       to stop decoding and transmitting non-critical data during downlink and uplink timeslots when the signal strength is below the threshold level for the predetermined period of time; and
       to perform IRAT measurement during non-critical time slots, in which the non-critical time slots comprise the time slots that do not carry the critical data.

12. The apparatus of claim 11, in which the critical data comprises power control and timing adjustment information.

13. The apparatus of claim 11, in which the critical data comprises call setup, channel reconfiguration and/or handover information.

14. The apparatus of claim 11, in which the critical data comprises scheduling and status report information.

15. The apparatus of claim 11, in which the at least one processor is further configured to prioritize the critical data based on information type where a highest priority is allocated to information including power control and timing adjustment information, and a next highest priority is allocated to information including radio resource control (RRC) information.

16. The apparatus of claim 11, in which the critical data is defined based on a service the critical data provides and in which a circuit switched voice call data has higher priority than a packet switched data.

17. A computer program product for wireless communication in a wireless network, comprising:
    a computer-readable medium having non-transitory program code recorded thereon, the program code comprising:
       program code to determine whether a serving cell signal strength is below a threshold level for a predetermined period of time, when a measurement gap corresponding to an idle time slot is not long enough for an inter-radio access technology (IRAT) measurement or no measurement gap exists;
       program code to decode and transmit critical data during downlink and uplink timeslots when the signal strength is below the threshold level for the predetermined period of time;
       program code to stop decoding and transmitting non-critical data during downlink and uplink time slots when the signal strength is below the threshold level for the predetermined period of time; and
       program code to perform IRAT measurement during non-critical time slots, in which the non-critical time slots comprise the time slots that do not carry the critical data.

18. The computer program product of claim 17, in which the critical data comprises power control and timing adjustment information.

19. The computer program product of claim 17, in which the critical data comprises call setup, channel reconfiguration and/or handover information.

20. The computer program product of claim 17, in which the critical data comprises scheduling and status report information.

* * * * *